US008313685B2

(12) United States Patent
Denis et al.

(10) Patent No.: US 8,313,685 B2
(45) Date of Patent: Nov. 20, 2012

(54) DEVICE FOR PRODUCING PIN-SHAPED END PRODUCTS BY THE INJECTION-MOLDING PROCESS

(75) Inventors: Murena Denis, Lugnorre (CH); Diem Werner, Brugg (CH)

(73) Assignee: Lonstroff AG

( * ) Notice: Subject to any disclaimer, the term of this patent is extended or adjusted under 35 U.S.C. 154(b) by 208 days.

(21) Appl. No.: 12/827,559

(22) Filed: Jun. 30, 2010

(65) Prior Publication Data

US 2011/0001269 A1 Jan. 6, 2011

(30) Foreign Application Priority Data

Jul. 1, 2009 (EP) .................................... 09008607

(51) Int. Cl.
B29C 45/27 (2006.01)
B29C 45/40 (2006.01)

(52) U.S. Cl. ..................................... 264/328.8; 425/556
(58) Field of Classification Search ................ 264/328.8; 425/556
See application file for complete search history.

(56) References Cited

U.S. PATENT DOCUMENTS

| 3,357,057 A | 12/1967 | Bucy |
| 3,575,233 A * | 4/1971 | Mahle et al. .................. 164/312 |
| 3,760,969 A | 9/1973 | Shimamoto et al. |
| 4,366,912 A | 1/1983 | Matukura et al. |
| 2002/0190430 A1 | 12/2002 | Fujiwara et al. |

FOREIGN PATENT DOCUMENTS

| DE | 2 146 421 | 4/1972 |
| EP | 0 148 426 | 7/1985 |
| EP | 1 020 277 | 7/2000 |
| FR | 1 136 064 | 11/1955 |
| JP | 57-047637 | 3/1982 |
| JP | 11 254486 | 9/1999 |
| WO | WO 95/24301 | 9/1995 |
| WO | WO 02/092312 | 11/2002 |

OTHER PUBLICATIONS

Office Action dated Mar. 6, 2012, for U.S. Appl. No. 12/882,750, filed Sep. 15, 2010.
Search Report dated Oct. 30, 2009, European Application No. EP09008607.

* cited by examiner

Primary Examiner — Jill Heitbrink
(74) Attorney, Agent, or Firm — Alston & Bird LLP

(57) ABSTRACT

The invention relates to an injection-molding tool and to a process for producing pin-shaped blanks as end products, a two-dimensional skin cavity and blank cavities connected to said skin cavity being provided at a runner, in order to be able to form a molding, including a sprue, a skin and the blanks formed on said skin via defined predetermined breaking points. In this case, the injection-molding tool makes it possible before and at the beginning of the injecting operation to create a negative pressure in the cavities and makes it easier after the molding material has solidified to demold the molding obtained by introduced compressed air. In this case, the injection-molding tool is constructed in such a way that the demolding of the blanks is performed separately from the demolding of the skin and the sprue, the demolding also being accompanied by detachment of the blanks from the skin by the lifting movement during the opening of the injection-molding tool, and the blanks being discharged with preference without being acted upon by a manipulator, on account of the loss of form fit and under the action of gravitational force, and the injection-molding tool being made operationally ready again at the end of the cycle by a closing operation.

17 Claims, 6 Drawing Sheets

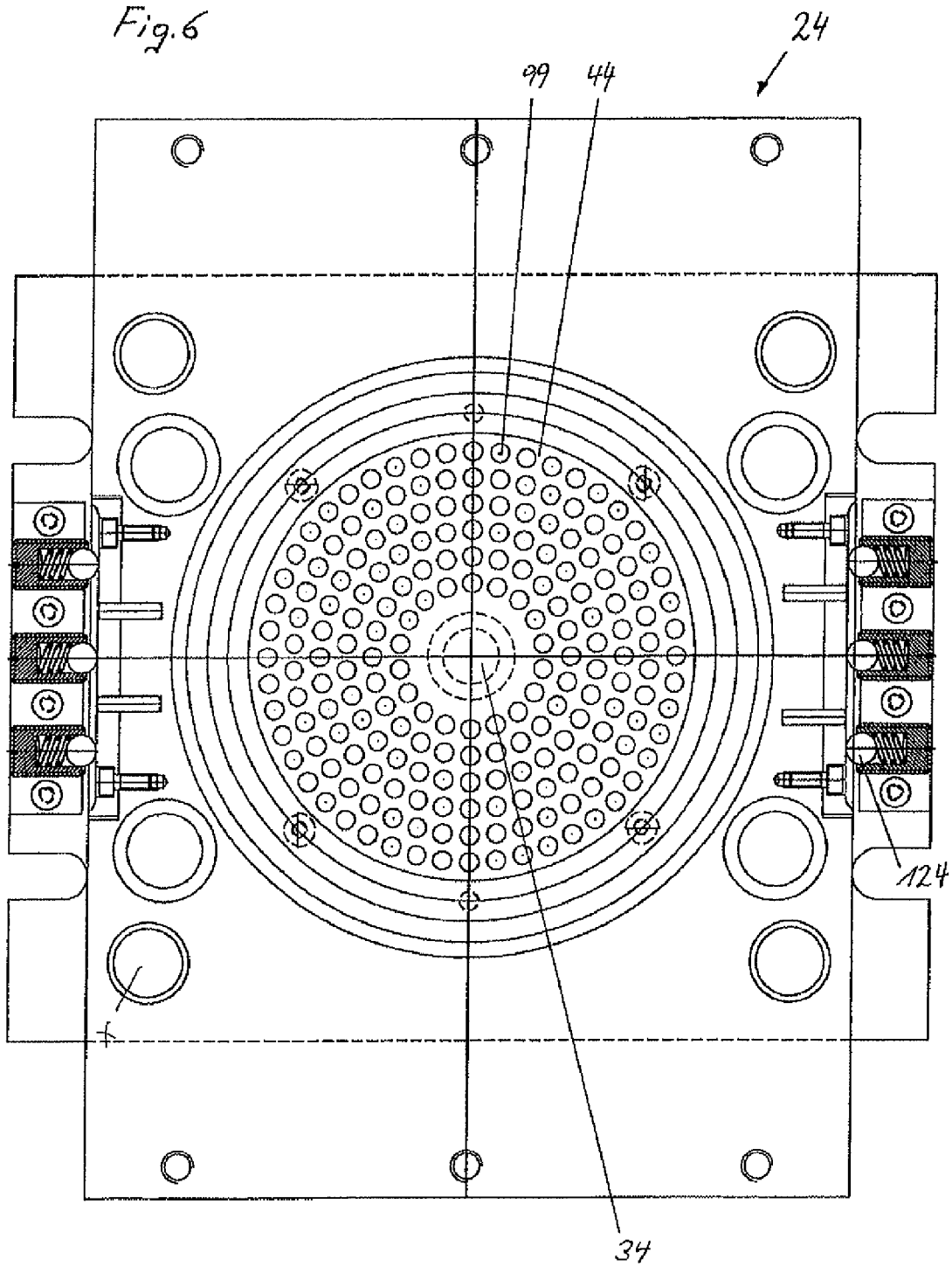

DEVICE FOR PRODUCING PIN-SHAPED END PRODUCTS BY THE INJECTION-MOLDING PROCESS

FIELD OF THE INVENTION

The invention relates to an injection-molding tool. The invention also relates to a process for using this injection-molding tool.

BACKGROUND

Injection-molding processes are widely used, in particular in the mass production of injection-molded parts of all kinds. Depending on the injection-molded part to be produced, a wide variety of functions, sizes and forms can be encountered.

The injection molding generally takes place in a cyclical sequence that can be repeated as often as desired, one or more injection-molded parts, referred to hereafter as blanks, being produced in each cycle. Liquefied molding material is introduced under pressure into a closed cavity, formed by a generally at least two-part hollow mold and possibly one or more cores, until the cavity is filled, followed by a solidifying process. After that, the cavity is opened, the blank, which in the meantime has hardened to a stable form, is removed, and the hollow mold is closed again.

In the case of particularly small blanks, to increase the efficiency and the number of pieces produced it is expedient to form the injection-molding tool in such a way that it makes it possible to produce a number of blanks simultaneously in one cycle. The molding material can be introduced through a runner leading from outside the injection-molding tool into the cavities thereof. A downstream gating system is responsible for distributing the molding material to the individual hollow molds for the blanks. A so-called molding is thereby produced.

The sprue is formed in the runner, the support system is formed in the gating system and the blanks are formed in corresponding cavities connected to the gating system.

The overall cavity of such an injection-molding tool consequently comprises the runner for forming the sprue, blank cavities for forming the blanks and a cavity which connects these blank cavities to the runner and forms the support system. This connecting cavity generally comprises individual channels. In cases such as the present case, in which many blank cavities are arranged close to one another, it is more expedient however to combine individual channels or even to form a common distributing space.

In such cases, the support system of the molding that is formed in the runner goes over from a branched structure into a two-dimensional structure.

In most cases, the entire molding is demolded completely and as a whole, in that it is discharged from the cavity manually or by a device, in order subsequently to be further processed in a separate working step. The blanks are thereby separated from the support system, usually locations of particularly low material thickness, known as predetermined breaking points, being provided at the transition from a blank to the support system, so that the blank is separated in a controlled manner from its support system at the desired location with little effort, often by simple tearing, shearing or bending.

The removal of the molding from the cavities is a recurrent problem, especially in the case of automated installations. This removal becomes all the more complicated the smaller, more complex and fine-membered the blanks and the support system are, and the more rubber-like or elastic or soft the injected molding material is. If the molding cannot be successfully demolded as a whole, individual regions are left behind or remain stuck in the cavity of the injection-molding tool. Problems also occur during the injection molding as a result of trapped residual air, which can disturb the formation of the surface of the blanks.

Moreover, separating the individual blanks from the common support system is also laborious and complicated to accomplish. A separate operation is generally provided for this after the injection-molding operation. Small blanks, in particular rubber-elastic blanks, also make this operation more difficult.

BRIEF SUMMARY OF THE INVENTION

The present invention is based on the object of providing an injection-molding tool of the type mentioned at the beginning that allows the production of especially fine-membered blanks from elastic and plastic materials in a simple manner and, furthermore, makes it possible for the blanks to be separated from the support system in an operation performed in conjunction with the opening operation and involving demolding and discharge of said blanks, and thereby avoids problems of the type mentioned at the beginning.

This object is achieved according to the invention by an injection-molding tool.

In its basic configuration, the injection-molding tool according to the invention has three subassemblies, to be specific a baseplate arrangement, a central plate and a blank plate arrangement. The baseplate arrangement preferably has a skin plate and a baseplate. The baseplate is intended for being connected to a stationary part of an injection-molding machine. Also provided in the baseplate is a runner, through which the molding material, in the present case a plastics material, in particular an elastomeric material, for example rubber-based, can enter a cavity. For this purpose, the molding material must be in an injectable state. Furthermore, the injection-molding tool has the central plate, which in the closed state of the injection-molding tool lies with one end face against the baseplate arrangement and forms a first separating area, and lies with an opposite end face against the third subassembly, the blank plate arrangement, to form a second separating area. The blank plate arrangement and the central plate represent the movable elements of the injection-molding tool. In principle, the central plate may be actuated and guided individually; in an advantageous configuration, it is guided on the blank plate arrangement.

In the closed state of the injection-molding tool, on the one hand the skin cavity is formed by the central plate and the skin plate, and on the other hand a predetermined number of blank cavities are formed by the central plate together with the blank plate arrangement.

The skin cavity is connected to the runner and together with the latter forms the support system of the molding, which in the present case comprises a sprue and a so-called skin. The central plate and the blank plate arrangement together form a number of blank cavities. With preference, for each blank cavity, the proportion of the surface area allotted to the central plate is much less than that in the blank plate arrangement; in an advantageous configuration, it is even reduced to just a delimiting area, which preferably represents a supporting area. The central plate consequently has on both its end faces, which lie in the first and the second separating area, hollow molds which respectively provide a partial region for the skin and blank cavities, it being possible for the depth of the hollow molds on the blank side to tend toward zero.

To fill the blank cavities, these hollow molds in both the separating areas of the central plate are connected to the skin cavity via a respective connection through the central plate. Starting from the skin cavity, each connection has, at least over part of its length, a feed impression and opens out into an inflow mouth formed on the blank side. This mouth is located in that region of the blank cavity that forms the supporting area and is advantageously arranged centrally.

The blank plate arrangement itself preferably comprises at least one end mold plate and one shaft mold plate, the latter in the closed state of the injection-molding tool lying on the one hand against the central plate in the second separating area and on the other hand against the end mold plate. The end mold plate is fixedly connected to the moving part of the injection-molding machine, whereas the shaft mold plate is mounted displaceably in relation thereto by a predetermined amount of travel, preferably guided on the end mold plate, and is also prestressed with respect to the central plate.

The supporting areas in the blank cavities support the created blanks in such a way that, during the opening of the injection-molding tool, the blanks become separated from the skin in the first separating area. It is therefore of advantage if the cross section of each supporting area is a multiple of the inflow cross section, preferably more than 10 times the inflow cross section. In this case, the remaining inflow cross section is, as far as possible, positioned coaxially in relation to any core that may be present.

To produce hollow blanks, for each blank cavity there is a preferably pin-shaped core fixed in the baseplate in a freely projecting manner and protruding into this blank cavity through the respective inflow mouth.

The skin cavity preferably has a two-dimensional cavity portion, from which inflow impressions are formed toward each inflow mouth, narrowing at least partially in the direction of the respective inflow mouth, and consequently in the direction of flow of the molding material.

This offers several advantages, since firstly any pin-shaped core there may be can be made thicker at the level of the skin cavity, which is beneficial for stability, and secondly the molding material can flow in more easily and distribute itself more uniformly, in a way comparable to a filling funnel, whereby faster filling is achieved and uneven loads on the core are largely avoided. Especially in the case of filigree hollow parts, which—as in the present case—require a high degree of precision, the differences in pressure occurring when the blank cavities are filled non-uniformly must be taken into consideration, or avoided as far as possible, on account of the high pressures and rapid flow rates.

It is preferred for the air that is present in the cavities of the closed injection-molding tool to be discharged by an external device before the injection of the molding material, in order to achieve a lower pressure level and to make the injecting operation easier. For this purpose, a vacuum source is connected to a negative-pressure channel opening out into the common skin cavity, whereby air can be discharged until just before the injecting operation. Thanks to a closing valve that is preferably present and is brought into the closed position by the molding material itself, the molding material is prevented from penetrating into the negative-pressure channel during the injecting operation.

During the injection, molding material prepared by the injection-molding machine is injected in the heated and liquefied, with preference low-viscosity, state through the runner into the skin cavity and from there into all the blank cavities, whereby the contiguous molding, having a sprue, a skin created in the skin cavity and the blanks created in the blank cavities, is produced. In this case, the closing valve that is preferably present is brought into the closed position right at the beginning by the molding material entering the skin cavity through the runner. In order to achieve a quick and complete filling operation, the injection takes place under adequately high pressure, which depends on the resistance of the cavities and the viscosity of the molding material, and preferably into the already evacuated cavities.

After that, when using a thermoplastic elastomer, the molding is cooled until a dimensionally stable state is achieved or, for example when using a rubber-like material, it is heated, a predetermined pressure preferably being maintained in each case in order to achieve the desired result. Cooling that may be necessary takes place by heat transfer to the injection-molding tool, possibly assisted by additional gas convection or use of cooling liquid. Heating that may be necessary, for example for purposes of polymerization, may additionally involve heating the injection-molding tool. The injection-molding tool in this case remains unmoved and unchanged until the molding has achieved an adequately dimensionally stable state.

Preferably, before the molding of the blank plate arrangement, the end mold plate is lifted off at the free ends, with the injection-molding tool otherwise closed, in such a way that a gap that is sealed off from the surroundings is formed between said end mold plate and the shaft mold plate. Since a compressed-air channel passes through the end mold plate into the gap, allowing the pressure in the gap to be increased from outside the injection-molding tool, the demolding of the blanks from the blank cavity is made easier and the blank plate arrangement can be lifted off as a whole in the second separating area.

The central plate is preferably provided with a drive. This allows the central plate to be lifted off from the baseplate arrangement in the first separating area and to travel over a certain distance, which is advantageously greater than the length of the projecting portions of the cores that may be present. As soon as the lifting-off of the central plate from the skin plate, and consequently opening of the injection-molding tool in the first separating area, takes place, the central plate with its supporting areas detaches all of the blanks at least approximately simultaneously from the skin of the remaining molding in the plane of the supporting areas and, on account of its adequately long, predefined amount of travel, makes it possible for the blanks to be stripped from the respective cores.

Since the skin cavity is then automatically opened at the same time, the counter force provided by the skin remaining in the static half of the cavity—of the baseplate arrangement—is preferably brought about by frictional and adhesive forces alone between said skin and the surface of this cavity region.

This means that the part of the skin cavity that is formed in the baseplate is formed in such a way that resultant frictional and adhesive forces act on the skin as a result of the shaping, preferably without a form fit being formed, and these forces are greater than those of the partial region of the skin cavity in the central plate plus the necessary forces for tearing off the blanks.

After that, the skin can be removed together with the sprue from the skin cavity and be pulled off from the cores. To make this easier, in the case of the baseplate arrangement, the part in which the part of the skin on the sprue side is formed may be arranged movably on the remaining part.

After the forming of all the elements of the molding, the plates of the injection-molding tool are brought again into a position in which they are lying firmly against one another;

the injection-molding tool is closed and ready for the next cycle. All the movements preferably proceed translatorily and parallel to one another.

The actuation of the individual plates over an individual cycle preferably takes place sequentially, it being possible for the individual sequences also to overlap for reasons of efficiency.

The present invention is described in more detail below on the basis of an exemplary embodiment that is represented in the drawing, in which purely schematically.

BRIEF DESCRIPTION OF THE SEVERAL VIEWS OF THE DRAWINGS

FIG. 6 shows the skin plate in a frontal view.

DETAILED DESCRIPTION OF THE INVENTION

Figure 1:
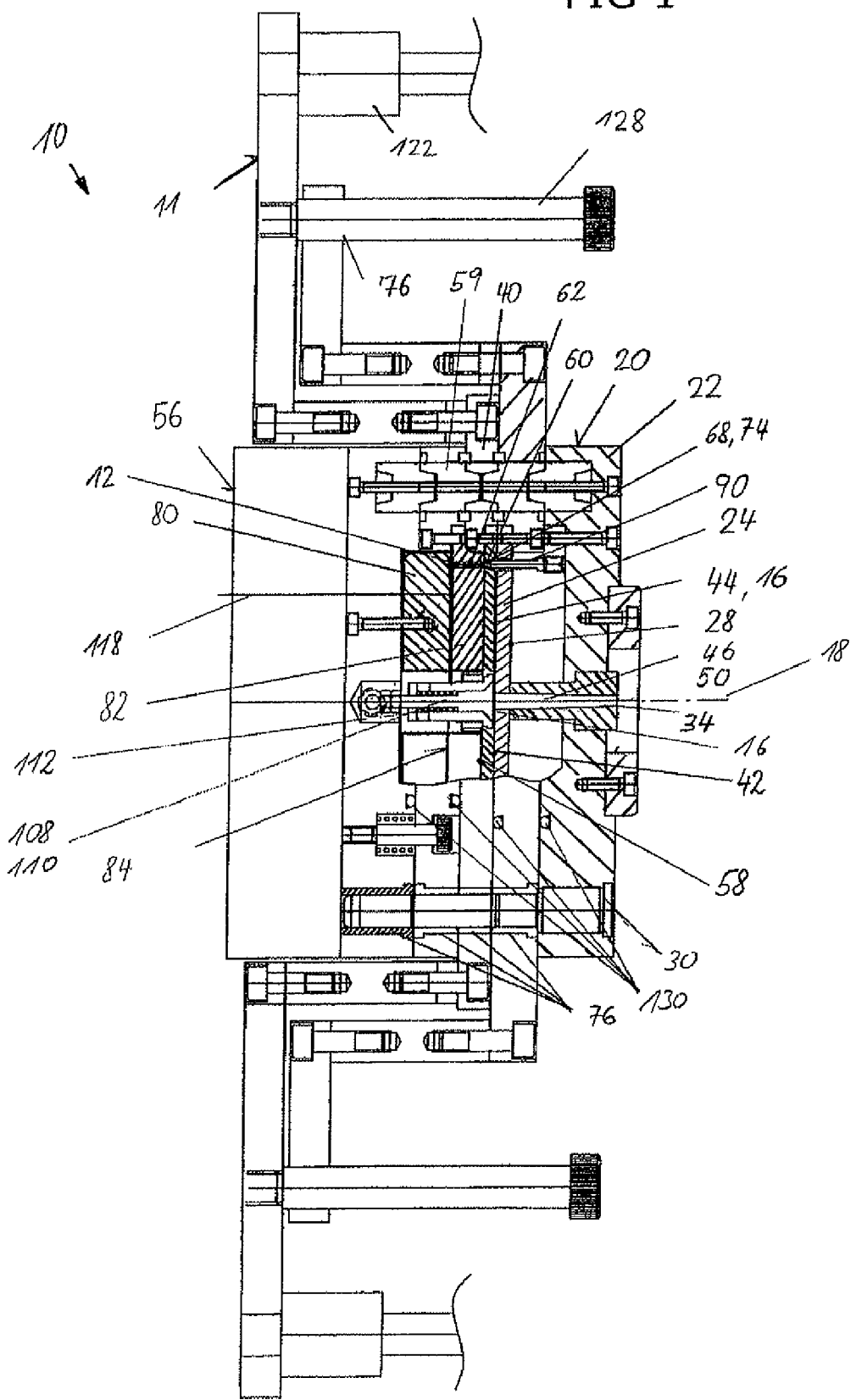
FIG. 1 shows a view of a section through an injection-molding tool according to the invention with a finished molding in the closed state before demolding.
Figure 2:
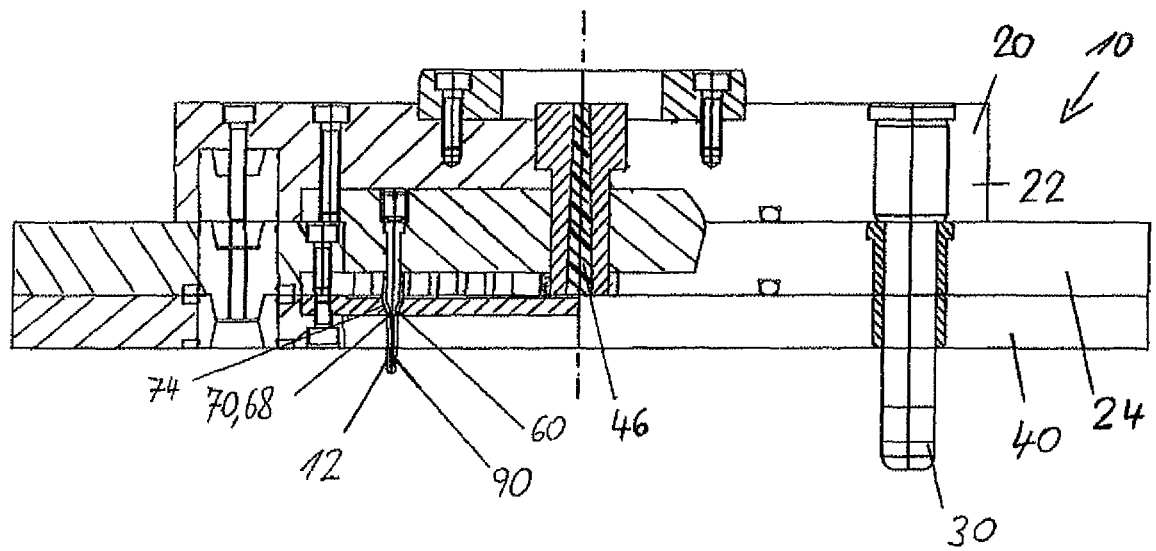
FIG. 2 shows a sectional view of the injection-molding tool according to FIG. 1 after separation of the blank plate arrangement in the second separating area.
Figure 2:
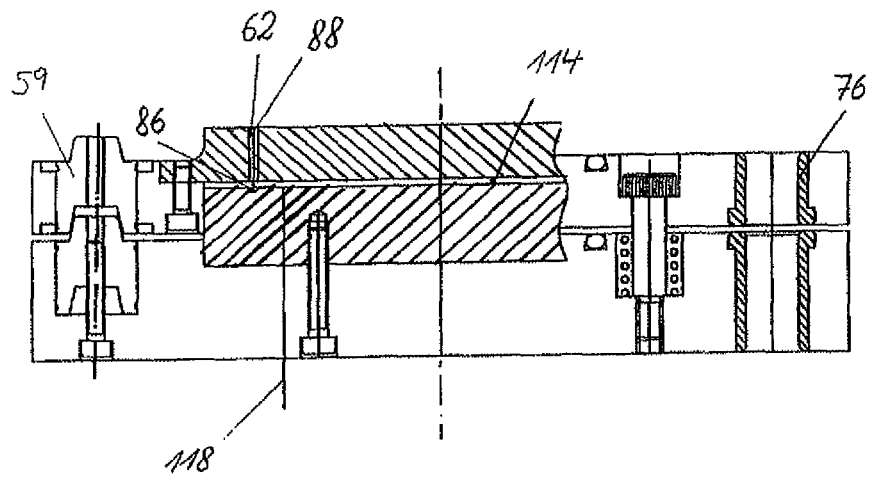
Figure 3:
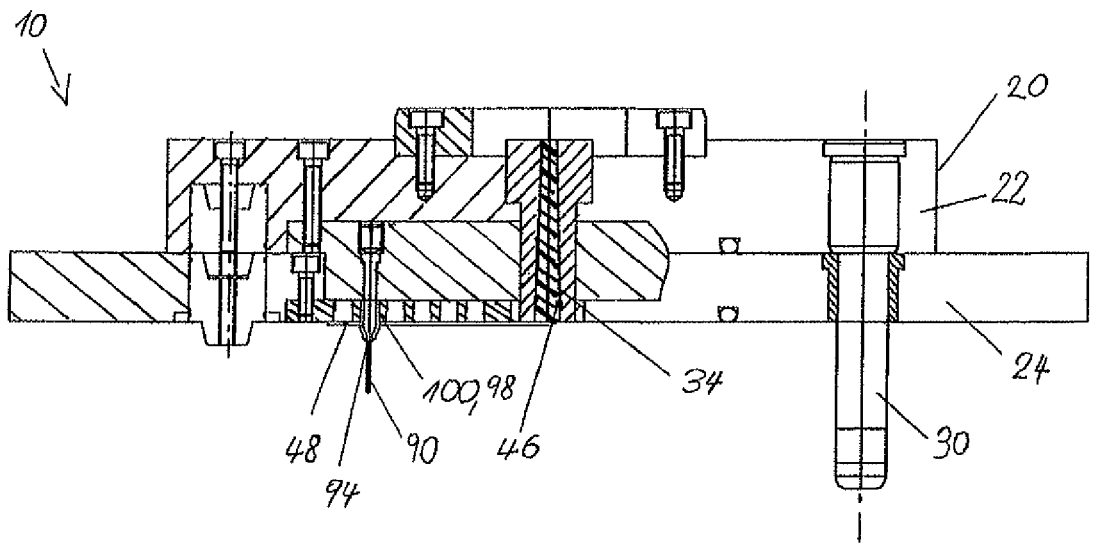
FIG. 3 shows a sectional view of the injection-molding tool according to FIG. 2 with the central plate lifted off from the baseplate arrangement.
Figure 3:
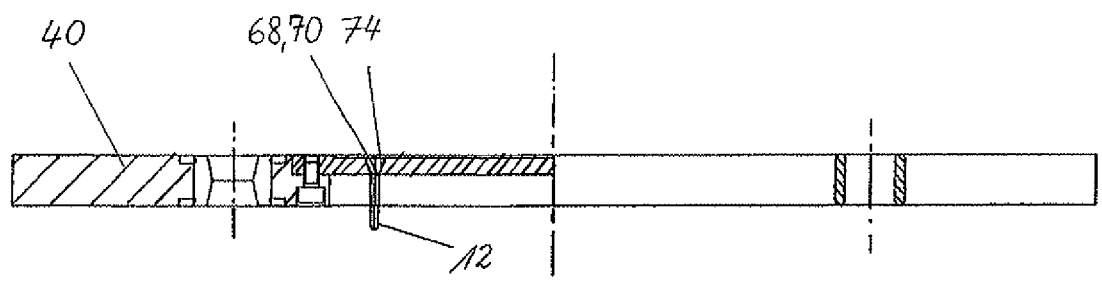
Figure 3:
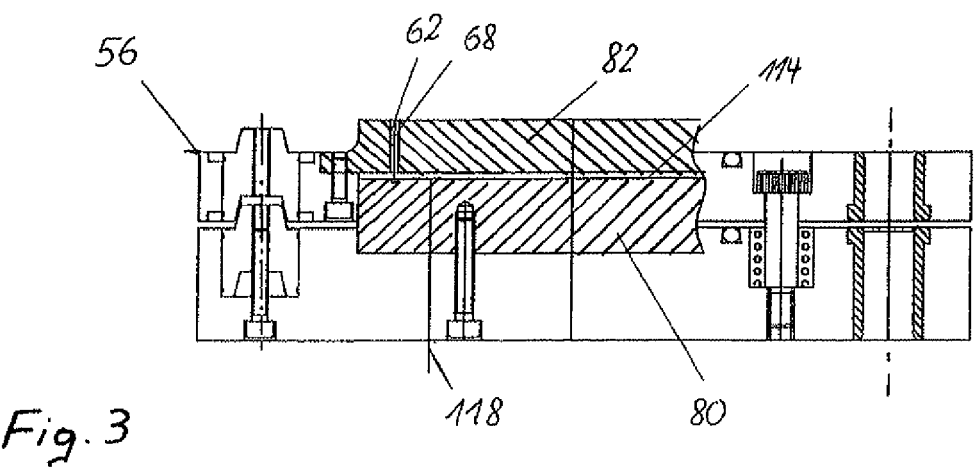
Figure 4:
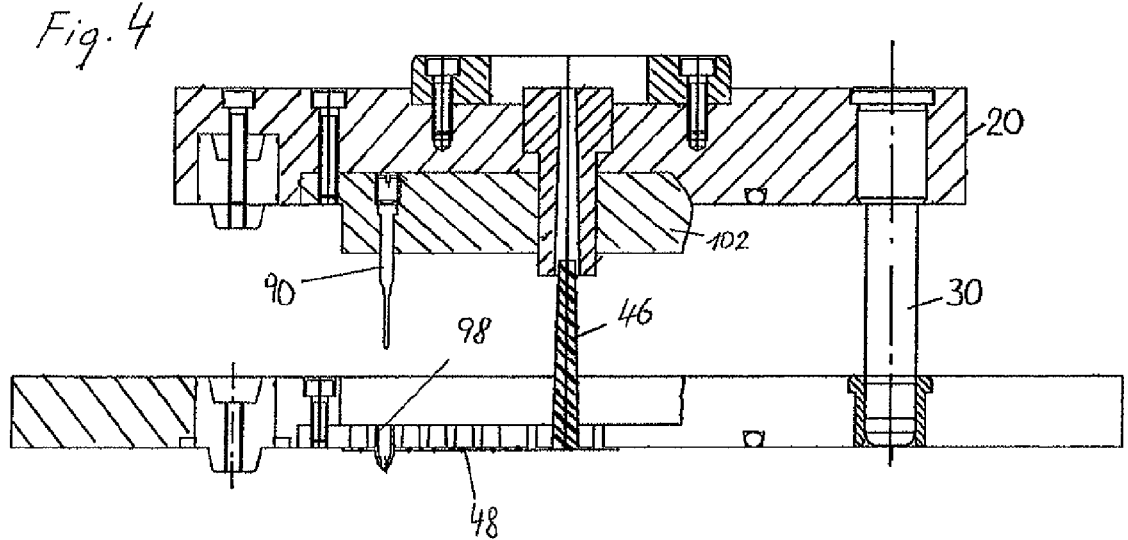
FIG. 4 shows a sectional view of the injection-molding tool according to FIG. 3 in the open position with, in addition, the baseplate arrangement separated by lifting-off of the skin plate, in the open position.
Figure 4:
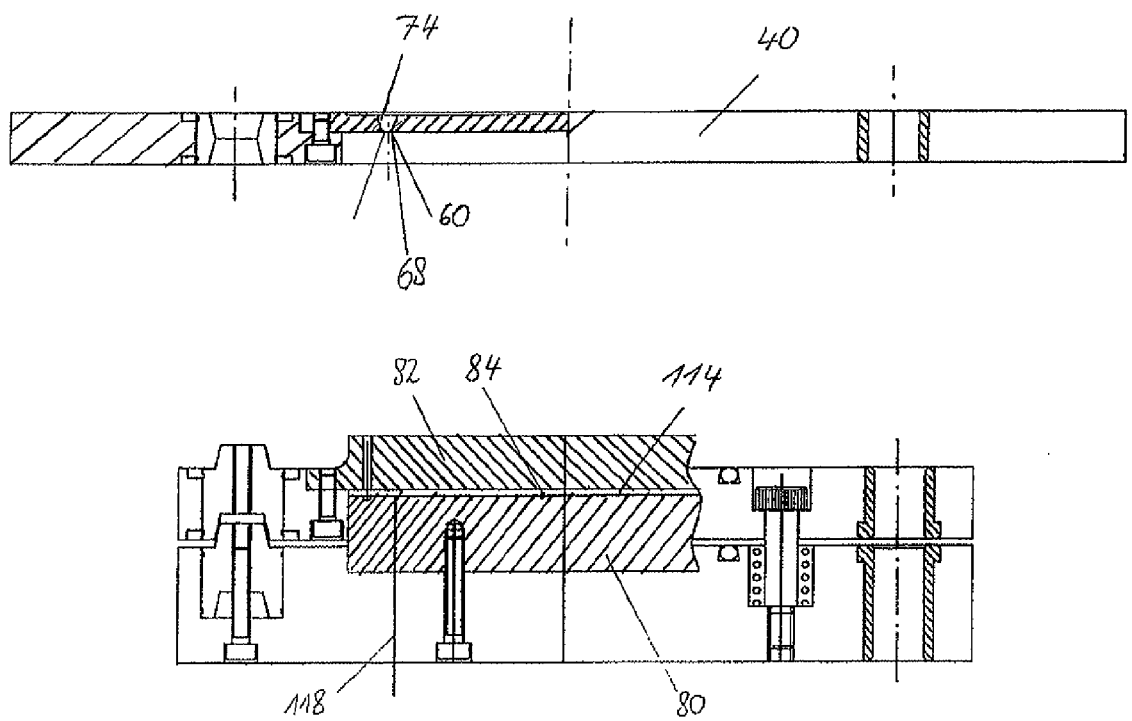

FIGS. 1 to 4 show views of a present injection-molding tool 10 in a particularly preferred embodiment in various stages of the process. FIG. 1 shows a view of a present injection-molding tool 10 in a particularly preferred embodiment in the closed state, FIG. 2 shows a view of the injection-molding tool 10 from FIG. 1 in a first partially opened state, FIG. 3 shows the injection-molding tool 10 in a second partially opened state, FIG. 4 shows the injection-molding tool 10 in a completely open state. In FIG. 1, essential elements of an external actuating device 11 are additionally represented.

The aim of the present injection-molding tool 10 is to produce a greater number of pin-shaped end products, known as blanks 12, detach them from their support system 16 and discharge the same in a single cycle.

FIG. 1 shows this injection-molding tool 10 in the closed position in a full section with a horizontally aligned center axis 18 as well as parts of an external actuating device 11. All of the movements of the components of the injection-molding tool 10 that are specified below take place at least approximately translatorily and parallel to this center axis 18.

The injection-molding tool 10 itself is suitable for use in conventional injection-molding machines and, in the present embodiment, comprises three main subassemblies.

The first subassembly is formed by a baseplate arrangement 20, which is fixedly connected to an injection-molding machine that is not represented here. This baseplate arrangement 20 comprises a baseplate 22 and a skin plate 24. The baseplate 22 provides the interface between the injection-molding tool 10 and the static side of the injection-molding machine and receives the skin plate 24 on its opposite end face 28.

This skin plate 24 lies against the baseplate 22 in two-dimensional contact. While the baseplate 22 is fixedly connected to the injection-molding machine, the skin plate 24 is guided translatorily on guide pillars 30, which are attached to the baseplate 22 parallel to the center axis 18. These guide pillars 30 ensure an exact movement of the skin plate 24 in relation to the baseplate 22.

As can be seen in FIG. 1, the baseplate 22 may likewise be of a multi-part configuration, but this depends on structural design features and is not relevant for the function.

Furthermore, the baseplate 22 has a runner 34 for supplying molding material. The runner 34 is advantageously arranged—as represented in FIGS. 1 to 3—coaxially in relation to the center axis 18. It is formed centrally in a sprue bush, which is led through the baseplate 22 and through the skin plate 24. However, alternative possibilities for the arrangement of the runner 34 are also conceivable. On that end face of the skin plate 24 that is situated away from the baseplate 22, the skin plate 24 is in two-dimensional contact with a central plate 40 as part of a second subassembly, whereby a first separating area 42 is defined. The central plate 40 may be separately guided; in this advantageous configuration, it is guided thanks to bores on the baseplate 22 analogously to the skin plate 24 on the guide pillars 30 and is displaceable parallel to the center axis 18, whereby an exact alignment of the central plate 40 in relation to the skin plate 24 is ensured.

The central plate 40 and the skin plate 24 together form a skin cavity 44, into which the runner 34 opens out. Together with the runner 34, the skin cavity 44 provides the hollow mold for the support system 16 of the molding 50 to be formed, comprising a sprue 46 and a two-dimensional, rotationally symmetrical skin 48. The skin cavity 44 is formed in a two-dimensional and thin-walled manner in the region of the first separating area 42, and serves for distributing the molding material to be introduced.

The central plate 40, which is in contact in FIGS. 1 and 2, is represented in the lifted-off, and consequently opened, state in FIGS. 3 and 4.

In the closed state of the injection-molding tool 10 according to FIG. 1, the central plate 40 is clamped between the baseplate arrangement 20, with which it defines the first separating area 42, and a blank plate arrangement 56 as the third subassembly, with which it forms a second separating area 58.

Furthermore, for each plate 22, 24, 40, 80, 82, at least one pair of so-called centering cones 59 is provided axially parallel and extending right through from one end face to the respectively opposite end face. In this case, each centering cone 59 engages with each end face in the adjacent centering cones 59 and thereby brings about fine centering; the centering cones 59 belonging to one another are exactly in line.

By contrast with the guide pillars 30, the centering cones 59 do not act over the entire amount of travel, but only undertake additional exact positioning in the last portion of the travel just before the mutual contact of the end faces that are respectively facing one another of adjacent plates 22, 24, 40, 80, 82 of the injection-molding tool 10, and additionally increase the accuracy with which the same are in line.

The blank plate arrangement 56 has blank hollow molds, which are formed in it in the direction of the second separating area 58 and in the present case correspond to a blind hole with a spherical bottom, are identical to one another in form and dimensions and are arranged parallel to the center axis 18 and symmetrical thereto. These blank hollow molds open out into the second separating area 58 and are delimited by the central plate 40. In principle, it is conceivable for the central plate 40 to have corresponding hollow molds with congruent contours as matching counter molds; in the present case, however, these hollow molds are not specifically formed, but are reduced in their depth to zero and are consequently formed by a common planar area which coincides with the second separating area 58 in the closed state. Consequently, when the blank plate arrangement 56 is lying against the central plate 40, each blank hollow mold is delimited at its open end by a respective partial region of the planar area, referred to hereafter as the supporting area 60. Consequently, a blank cavity 62, as represented in FIGS. 1 to 4 and in detail in FIG. 5, for producing the blanks 12 is formed by each blank hollow mold in conjunction with a respective one of the supporting areas 60. These blank cavities 62 respectively adjoin an inflow mouth 68, which opens out centrally into their respective supporting area 60 and reduces the latter to an annular area.

This annular supporting area 60 of each blank cavity 62 has the task during the demolding operation of also bringing about a separation of the associated blank 12 from the common skin 48 at the beginning thereof and adequately supporting the blank 12 on its blank end face 70, in order that a certain surface pressure is not exceeded.

In the present case, the blank cavities 62 are respectively aligned parallel to one another and are identical in form and dimensions, but this is not necessarily a precondition for the present invention.

Each blank cavity 62 is connected in the region of its supporting area 60 via the associated inflow mouth 68 to the opposite side of the central plate 40 and the skin cavity 44 located there by way of a feed impression 74.

The inflow mouths 68 are respectively arranged concentrically in relation to their blank cavity 62. The feed impressions 74 are aligned axially parallel to the center axis 18 and narrow in the direction of the inflow mouths 68 over most of their depth. The conical formation of the feed impressions 74 has the effect that molding material which, coming from the runner 34, is distributed in the two-dimensional region of the skin cavity 44 flows as uniformly as possible and with lowest possible resistances into the feed impressions 74, and can leave the skin cavity 44 and enter the blank cavities 62 at the inflow mouths 68.

Instead of the formation of a two-dimensional skin cavity 44 as a hollow mold for the support system 16, individual channels, starting from the runner 34 and ending at the feed impressions 74, would also be conceivable—especially in the case of a smaller number of blanks to be produced. This would have the effect of reducing the proportion of molding material that is lost for the concurrent forming of the support system 16, especially in cases in which solidified molding material can no longer be recycled. In the present case, the configuration represented is more expedient, however, on account of the numerously distributed blank cavities 62.

The blank plate arrangement 56 is arranged on the movable part of the injection-molding machine, is moved linearly by the latter and does not require any further restricted guidance. As represented in FIGS. 1 to 3, however, by analogy with the central plate 40, there are bushes 76, which allow retraction of the guide pillars 30 during the closing of the injection-molding tool 10 before the end position is reached, with the aim of an exact alignment of all the moving elements in relation to one another. The blank plate arrangement 56 is of a substantially two-part form and comprises an end mold plate 80, as a basic body which is attached to the movable part of the injection-molding machine, and a shaft mold plate 82. This shaft mold plate 82 is carried by the end mold plate 80 and arranged displaceably in relation to it, linearly and parallel to the center axis 18.

A separating plane 84 lying in between is likewise aligned parallel to the first and second separating areas 42, 58 and thereby set at a distance from the second separating area 58 such that the head regions 86 of the blank cavities 62 that are situated away from the mouth are formed in the end mold plate 80.

Figure 5:
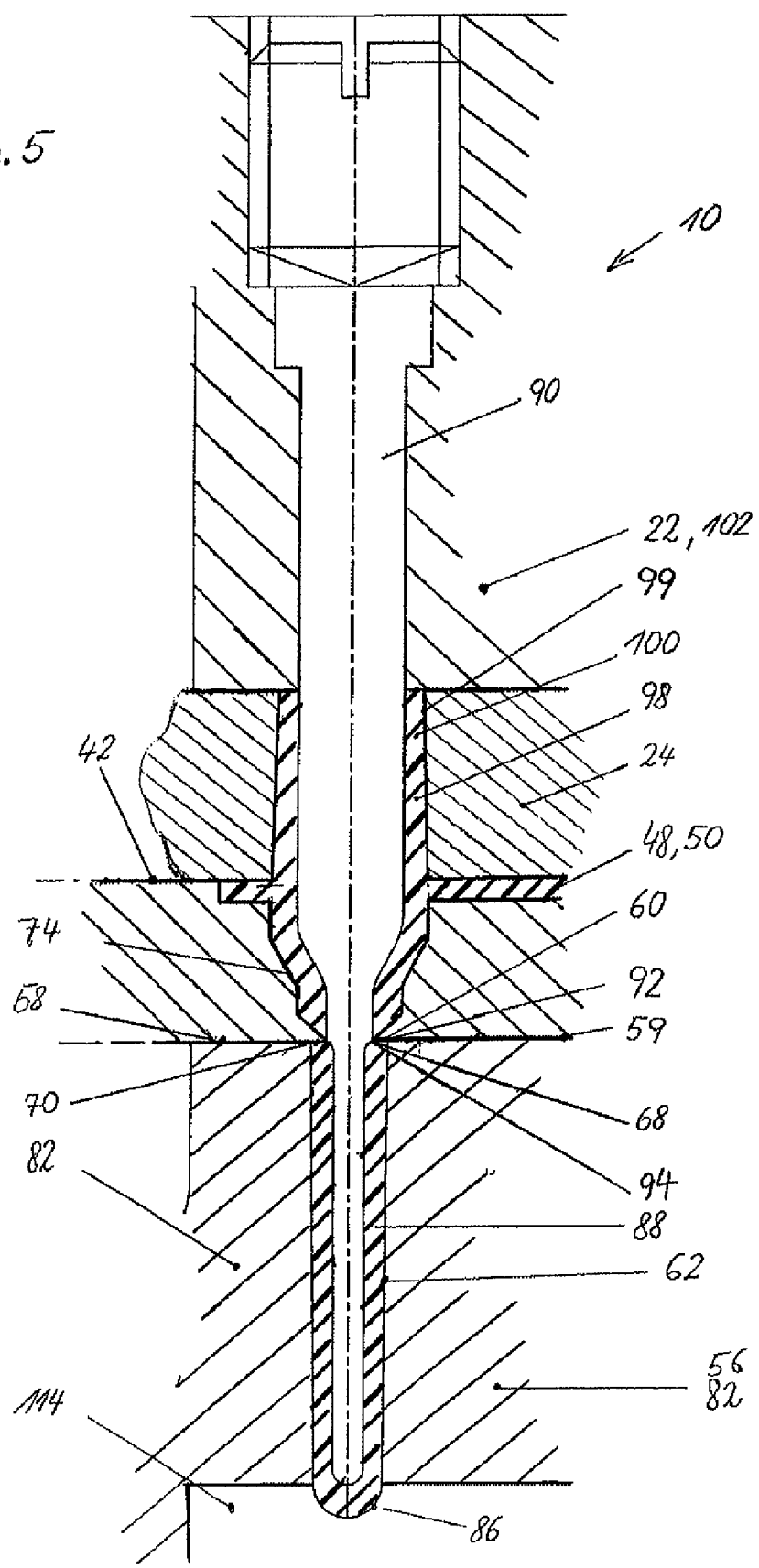
FIG. 5 shows a view of a blank in a blank cavity with a pin-shaped core, parts of the skin and parts of the closed injection-molding tool.

In the present case, as shown in FIG. 5, the part of the blank cavity 62 that is in the central plate 40 is reduced to the supporting area 60 lying in the—in this case planar—second separating area 58. However, it would be conceivable for part of the shaft region 88 of the blank cavity 62 also to be formed in the central plate 40. In the present case, this entire shaft region 88 of the blanks 12 is accommodated in the shaft mold plate 82.

In the case of blanks 12 that are variously formed or of different sizes, the second separating area 58 could have a number of partial areas, which do not necessarily have to lie in a common plane, as they do in the present case.

By analogy with the baseplate 22, in FIGS. 1 to 3 the end mold plate 80 is likewise represented as being of a multi-part form, but the multi-part form is only a result of the structural design, a one-part configuration would also be conceivable.

Since, in the present case, the blanks 12 are to be produced with an internal bore, pin-shaped cores 90 are provided in the individual blank cavities 62, as specifically shown in FIG. 5 or in FIGS. 1 to 3. The cores 90 protrude freely through the respective feed impression 74 of the skin cavity 44 and through the inflow mouth 68 into the blank cavity 62. The cores 90 are clamped on one side in the baseplate 22 and are respectively aligned coaxially in relation to the feed impression, and in particular to the respective blank cavity 62.

Since in this case the blank 12 is closed at the end face and does not have a through-bore, the cores 90 must project freely.

FIG. 5 shows that, in the particularly critical region of the inflow mouth 68, the core 90 comes very close to the contour thereof, and all that remains is a very small, circular inflow cross section 92, through which molding material can flow from the skin cavity 44 into the blank cavity 62. The finished molding 50 consequently has only a very small material thickness at each of these locations, whereby a predetermined breaking point 94 is automatically formed between the blank 12 and the skin 48.

This form of the feed impressions 74 has several advantages, since firstly the pin-shaped core 90 can be made thicker in the region of the skin cavity 44, which is beneficial for its stability, and secondly the molding material can flow in more easily and distribute itself more uniformly. Since, in the region of the feed impressions 74, the core 90 follows with its longitudinal contour that of the feed impression 74 while maintaining a minimum distance, formed in between is a kind of funnel with an inner core, by which a twist-like movement is imparted to the supplied molding material, and so it can flow more uniformly into the respective blank cavity 62. As a result, a more uniform, homogeneous filling operation is achieved and non-uniform radial loads on the core 90 are at the same time reduced. Especially in the case of filigree hollow parts, such as the blank 12 in the present case, which require a high degree of precision, the differences in pressure occurring when the blank cavities 62 are filled non-uniformly must be taken into consideration on account of the high pressures and high flow rates, since there is the risk of the filigree cores 90 bending, with the concomitant effect that the filling operation is no longer symmetrical, or even rupturing.

In this case, the remaining inflow cross section 92 should as far as possible be positioned coaxially in relation to the core 90 and be small in relation to the surrounding supporting area 60. However, the dimensions of its inflow cross section 92 must be adequately large to ensure the necessary through-flow of molding material under corresponding resistance.

So it can be seen in FIG. 5 that the cross section of the supporting area 60 is a multiple of the inflow cross section 92; in the present case, the supporting area 60 is at least 5 times, preferably more than 10 times, the inflow cross section 92, which forms a circular ring of here approximately 0.1 mm. Depending on the molding material and the function, the circular ring may also be of a different size.

The inflow cross section 92 defines the position of the predetermined breaking point 94 for the blank 12; it is therefore endeavored to keep it as small as possible. In the present case, the plane of the predetermined breaking point 94 coincides with the second separating area 58.

In FIG. 5, a hollow nub 98 is also represented as a formation on the skin 48. These are not necessary in every case, but they assist the mixing operation on account of their cross section being practically congruent with the feed impressions 74. They also increase the sum of the surfaces of the skin cavity 44 in the direction of movement of the central plate 40, which has the effect of increasing the adhesiveness of the injected skin 48 in its skin cavity 44, and in the present case is desired. The hollow nubs 98 are formed in annular slits 100 which are part of the skin cavity 44 and are formed in a practical way on the periphery of the core 90, in that the necessary, through-running skin bores 99 for the cores 90 are made correspondingly larger in the skin plate 24, so that a respective hollow space in the form of an annular cylinder, and consequently the annular slit 100, is formed. These annular slits 100 are delimited at the end face by the baseplate 22. Consequently, when molding material flows in, the annular slits 100 are likewise filled and, as a result, are concurrently formed at the same time as the molding of the skin 48. Consequently, an adequate resistance between the skin 48 and the hollow mold in the skin plate 24 is obtained by exclusively frictional engagement. However, instead of the annular slits 100, alternative formations that have the same purpose are also conceivable.

It is also shown in FIGS. 1 to 3 and 5 that the cores 90 can be fitted from the rear side of a core support 102 of the baseplate 22, which brings with it advantages in terms of the structural design. The core support 102 is part of the baseplate 22, and supports all the cores 90, which are pushed through from the rear side thereof, through skin bores 99 in the skin plate 24, and are fixed by threaded pins at internal threads in the core support 102. Consequently, the core support 102 can be easily removed and exchanged, for example for repair purposes, without the entire baseplate 22 having to be removed from the injection-molding machine during the exchange. In this respect, the connecting screws that have to be actuated directly or indirectly to take off the core support 102 may also be arranged differently than as they are represented in FIGS. 1-4 on account of practical requirements.

Provided coaxially in relation to the center axis 18 in the blank plate arrangement 56 is a closing valve 108 with a cup tappet 110, which reaches through the central plate 40 in the surface region of the skin cavity 44. Connected to this closing valve 108, by way of a negative-pressure channel 112, is a vacuum source (not represented), by which the air that is present in the cavities 44, 62 of the closed injection-molding tool 10 can be extracted, in order in this way to be able to provide a lower pressure level, in the ideal case a vacuum. This makes the injecting operation easier and significantly improves the molding result.

For this purpose, the closing valve 108 is in the open position, which represents its basic position, in that the cup tappet 110 protrudes in a spring-supported manner into the skin cavity 44 and the air contained can be brought out. The cup tappet 110 has the task of sealing off the closing valve 108 at its seat with respect to the skin cavity 44 and withstanding the pressure in the skin cavity 44. For this reason, the cup tappet 110 only opens in the direction of the skin cavity. Since the cup tappet 110 is almost in line with the runner 34, molding material flowing in impinges on the cup of the cup tappet 110 and automatically closes the closing valve 108.

If, in the case of the blank plate arrangement 56, the end mold plate 80 has been lifted off in relation to the shaft mold plate 82, formed between the two is a gap 114, the surrounding gap of which is at least virtually sealed with respect to the surroundings in the peripheral region. Furthermore, the blanks 12 protrude with their head regions 116 into this gap 114. A compressed-gas channel 118, by which the pressure in the gap 114 can be increased from outside the injection-molding tool 10, also passes from the outside through the end mold plate 80 into the gap 114. This increasing pressure assists the operation of demolding the blanks 12 from the mold cavities 62 when the shaft mold plate 82 is lifted off.

FIG. 6 shows a plan view on the hollow mold side of the skin plate 24. Depicted centrally in this case are the mouth of the runner 34 and the two-dimensional region of the skin cavity 44, which in the present case has a circular delimitation. Alternatively, a different form, for example a square delimitation, would also be possible, but a circular configuration ensures a uniform filling operation during the injection. The skin bores 99, which are present in the skin plate 44 and through which the cores 90 penetrate from the rear side into the skin cavities 44 while maintaining the annular slit 100, can also be seen. The arrangement and number of skin bores 99 correspond to the arrangement and number of blank cavities 62.

While the blank plate arrangement 56 as a whole is actuated by the injection-molding machine, the actuation of the central plate 40 takes place by an external actuating device 11. This has actuators, in the present case central plate cylinders 122, which act in the peripheral region on extensions of the central plate 40. The skin plate 24 is kept in loaded contact against the baseplate arrangement 20 up to a certain limiting force by a resistance device 124, which is realized in the present case—as can be seen in FIG. 6—by spring-actuated balls. Only after traveling a certain distance is it set in motion translatorily, and so lifted off from the baseplate arrangement 20, by so-called travel limiters 128, which are fixedly connected to the central plate 40. As an alternative to the central plate cylinders 122, other pneumatic, hydraulic, electrical or electromechanical drives are also conceivable.

The movement between the end mold plate 80 and the shaft mold plate 82 may take place hydraulically, mechanically or by compressed air, as soon as there is no longer any pressing force being applied by the injection-molding machine 10.

The process steps specified below describe a single cycle, in which one item of the molding 50 is produced. After one cycle, an identical cycle begins once again and the process steps are carried out once again.

In principle, the actuation of the individual components of the injection-molding tool 10 over a complete cycle takes place sequentially, it also being possible for the individual sequences to overlap to shorten the cycle times.

The process using said injection-molding tool 10 allows the blanks 12 to be produced and detached from the remaining molding 50 as well as the blanks 12 to be discharged in a single cycle.

At the beginning of the cycle, the injection-molding tool 10 is closed; the blank plate arrangement 56 and the baseplate arrangement 20 lie against the central plate 40 in the first and second separating areas 42 and 58. The pressing pressure in the first and second separating areas 42, 58 is applied by the injection-molding machine to the blank plate arrangement 56; the central plate cylinders 122 are preferably not under any force. However, they may be under force, in order to press the central plate 40 against the baseplate arrangement 20.

As a result, all of the cavities 44 and 62 are also closed; on account of the molding material that is present in the supplying device of the injection-molding machine, and also any seals 130 there may be between moving components, there is a seal with respect to the surroundings on the input side at the runner 34; in the interconnected cavities 44, 62, there is trapped ambient air at atmospheric pressure. In the unactuated state, the closing valve 108 is kept in the open position by a compression spring.

In a first process step, the trapped air is then extracted as well as possible from the cavities 44, 62 via closing valve 108, through the negative-pressure channel 112, in order to achieve at least a state similar to a vacuum. This operation could be omitted if the injection-molding tool 10 is operated in a vacuum or low-pressure environment.

In a second process step, molding material is introduced through the runner 34, flows at high speed into the skin cavity 44 and impinges there on the cup of the closing valve 108, whereby the centrally impinging stream of molding material is deflected in radial directions. At the same time, the back pressure occurring, which forms on account of the inflow velocity when the stream of molding material impinges on the cup tappet 110, causes closing of the closing valve 108.

The first process step and the sequence so far of the second process step advantageously take place in a partially overlapping manner, in order to keep the duration of the cycle as short as possible.

During the inflow, the pressure on the closing valve 108 is maintained by the replenishment of the molding material. This material flows through the skin cavity to the feed impressions 74 and enters the blank cavities 62 through the inflow mouths 68. Once the blank cavities 62 and the skin cavities 44 are filled, the volumetric flow tends toward zero, but the molding material is put under high pressure by the injection-molding machine and the closing valve 108 remains closed. As soon as the molding material has reached a certain firmness as a result of the curing or solidifying process, and the molding 50 has formed, the pressure drops, but the closing valve 108 remains closed, since movement is hindered by the then solid molding material.

After the molding material has cured to form the molding 50, the demolding operation begins with a third process step. In this third process step, the end mold plate 80 is moved by a predetermined amount of travel by the movable side of the injection-molding machine; the shaft mold plate 82 remains on the molding 50 as a result of the adhesion, and the blank plate arrangement opens, so that the gap 114 is formed. The injection-molding tool 10 is relieved. The molding 50 remains enclosed in the outwardly closed injection-molding tool 10; only the head regions 116 of the blanks 12 project freely into the gap 114. Parallel to the movement, in the third process step a positive pressure is built up in the gap 114 forming, in that compressed air is introduced through the compressed-gas channel 118.

In a fourth process step, the blank plate arrangement 56 is returned and the tool is separated in the second separating area 58. In this case, the shaft mold plates 82 lift off with their shaft cavity portions from the blanks 12, so that the latter are exposed. The compressed air in the gap 114 thereby assists the operation of forming the blanks 12. The amount of travel is in this case made to match the geometry of the blanks 12 in such a way that the blanks 12 are not spatially hindered in the subsequent process step. FIG. 2 shows the end state after this process step.

Instead of compressed air, some other gas would also be conceivable.

In a further process step, the central plate 40 is moved translatorily by a defined amount of travel, which corresponds at least to the length of each core 90 in the shaft of a blank 12, and is thereby lifted off from the skin plate 24 in the first separating area 42. In this case, on account of the form fit that is present, the central plate 40 acts at its supporting areas 60 on the annular end faces of the blanks 12 that are situated away from the free end and tears off said blanks from the common skin 48 in the region of the inflow mouth 68, on account of the predetermined breaking point 94 present there, in that the tensile strength of the molding 50 is exceeded. In most cases it is possible to influence the tensile strength here, in that corresponding temperature states are chosen by providing corresponding waiting times in the solidifying process.

In order to be able to pull off blanks 12 that are only loosely attached to the cores 90 from said cores by the tearing-off action, the blanks 12 are pulled from the cores 90 thanks to the corresponding travel of the central plate 40. As soon as the hold provided by the cores 90 is lost, the blanks 12 fall downward under gravitational force and can be collected by a device that is not represented.

In cases in which blanks 12 are produced without a bore, the travel of the central plate 40 would have to be limited to a minimum, since the blanks 12 fall out of the injection-molding tool 10 under gravitational force immediately after tearing-off.

The movement of the central plate 40 takes place in the present case according to FIG. 1 by central plate cylinders 122, which are provided symmetrically outside the central plate 40. Other actuators would alternatively be conceivable, but it would also be possible to make the central plate be forcibly taken along with the blank plate arrangement 56. Since, in the present case, the guide pillars 30 are too short to guide the central plate 40 over the entire amount of travel, this restricted guidance must be undertaken by the central plate cylinders 122 or other devices that are not represented. Alternatively, it would also be possible to make the guide pillars 30 longer, if this is spatially possible.

In order that tearing-off of the blanks 12 can take place at all, the skin 48 must become detached during the lifting-off of the central plate 40 from the part of the surface thereof that is on the skin cavity 44 and remain attached in the part thereof that is on the skin plate 24. In order that this is the case, the retaining force, comprising the sum of the frictional and adhesive forces acting in the direction of movement between the skin 48 and the skin plate 24 and the cores 90 in the region of the skin cavity 44 must be greater than the sum of the counter forces comprising the force for the tearing-off of the blanks 12 plus the adhesive forces between the skin 48 and the central plate 40 plus the frictional forces of the blanks 12 on corresponding portions of the cores 90.

In order that this retaining force is correspondingly high, the annular slits 110 are formed in the hollow mold of the skin plate 24 and, during the molding of the skin 48, help to form formations, in the specific case hollow nubs 98, on the side facing away from the blanks, and so the formation of greater frictional areas is achieved.

Since the additional frictional areas are distributed continuously over the skin 48, the risk of inadequately stable skins 48 being torn apart on account of shearing forces occurring within the skin 48, and of incomplete formation of the blanks 12 occurring, is reduced.

Since the skin cavity 44 is now open, the remaining part of the molding 50 is freely accessible in the hollow mold of the skin plate 24.

In the present case, the hollow nubs 98 are consequently concurrently formed concentrically in relation to the inflow mouths 68, whereby any shearing forces that may occur on the skin 48 are minimized and the skin 48 is capable of offering adequate resistance.

It is therefore also of advantage to form the hollow mold for the sheet-like, circular basic body of the skin 48 in the skin plate 24, in order that the skin 48 is additionally held at its outer periphery.

The skin plate 24 is preferably formed as an independently movable unit and is guided on bushes 76 by the guide pillars 30 over the entire necessary travel. As a result, the translatory movement takes place in line with that of the central plate 40. In the present case, the actuation to make the skin plate 24 travel takes place by it being forcibly taken along by travel limiters 128 on the central plate 40 and, as it were, pulled along by them. Once the central plate 40 has covered a certain distance, the skin plate 24 is taken up by the travel limitation and moved along with it in a translatory manner by a certain distance. The maximum distance between the central plate 40 and the skin plate 24 is defined by way of these travel limiters 28. This restricted guidance is advantageously retained over the entire amount of travel. By this operation, the skin 48 that is located in the skin plate 24 is pulled off from the cores 90, which are stationary in the baseplate 22, and at the same time the sprue 46 that is connected to the skin 48 is formed from the runner 34. This state is represented in FIG. 4. Since there is now no longer the resistance on the cores 90, the skin 48 with the sprue 46 can be easily removed from the hollow mold of the skin plate 24. This may take place manually or by an automated manipulator. It goes without saying that an independent drive for the skin plate 24 would also be alternatively conceivable.

In this state, the injection-molding tool 10 is in the completely open position and all of its movable components are separated from one another, but in line with one another.

In this position, various working steps may be necessary, such as inspecting and cleaning the cavities or applying a release agent.

As the last process step to complete the cycle, the closing movement of the injection-molding tool 10 from the open position in FIG. 4 is performed.

In this case, firstly the central plate 40 is moved back in the direction of the baseplate arrangement 20 by the central plate cylinders 122. The return movement of the central plate 40 may preferably be performed by the central plate cylinders 122, but alternative electrical, mechanical or pneumatic drive possibilities would also be conceivable.

After that, or with an overlap in time, the return movement of the blank plate arrangement 56 is performed by the movable part of the injection-molding machine until it lies against the central plate 40 in the second separating area 58. In a preferred embodiment, first the shaft mold plate 82 comes into contact with the central plate 40, and only after that does the end mold plate 80 come into contact with the shaft mold plate 82, during which the closing of the gap 114 takes place.

In the case of an alternative sequence of movements, first the blank plate arrangement 56 is moved back in the direction of the baseplate arrangement 20 by the movable part of the injection-molding machine; in its return journey, it thereby comes to lie against the central plate 40 in the second separating area 58; in a preferred embodiment, first the shaft mold plate 82 and only after that the end mold plate 80 comes into contact, during which the closing of the gap 114 takes place. Once there is full two-dimensional contact in the region of the second separating area 58, the forcible taking-along of the central plate 40 takes place. In this case, the central plate cylinders 122 must be movable without any force, and must not counteract the movement. In this case, single-acting cylinders are therefore adequate. Alternatively, instead of the central plate 40 being forcibly taken along, it could also be moved along independently in the closed position, in that the central plate cylinders 122 are of a double-acting configuration and bring about the return travel. Further mechanisms are conceivable.

On the further return path in the direction of the closing position, the skin plate 24 comes to lie in the first separating area 42, so that the skin cavity 44 is closed, and, on account of being forcibly taken along, the skin plate 24 is made to move together with the central plate 40 and the blank plate arrangement 56 back into the closed position, until full two-dimensional contact with the baseplate 22 is obtained. The cores 90 thereby penetrate through the corresponding skin bores 99 of the skin plate 24 into the closed skin cavity 44 and into the blank cavities 62. In order that this is possible without any problem, very exact guidance in relation to one another is necessary, and the sensitive cores 90 must not experience any deformations.

The injection-molding tool 10 is then completely closed and the individual components are held in contact with one another by a predetermined closing force of the injection-molding machine. The injection-molding machine 10 is then in the starting position again and is ready for the next cycle.

The invention claimed is:

1. An injection-molding tool with a baseplate arrangement, which has a runner configured for connection to an injection-molding machine, a central plate, which—in the closed state of the injection-molding tool—lies against the baseplate arrangement in a first separating area and together with said baseplate arrangement forms a skin cavity connected to the runner, and a blank plate arrangement, which—in the closed state of the injection-molding tool—lies against the central plate in a second separating area, with said central plate delimits a number of blank cavities and is configured to be arranged on the movable part of the injection-molding machine, the blank cavities being connected to the skin cavity by way of a respective inflow mouth formed on the central plate for filling with molding material, and being delimited by a respective supporting area, which is formed on the central plate and runs in a continuous annular manner around the inflow mouth, and the supporting areas supporting the created blanks in such a way that, during the opening of the injection-molding tool, in the first separating area the blanks become separated from the skin created in the skin cavity, wherein, for each blank cavity a pin-shaped core having a circular cross-section is fixed in the baseplate arrangement in a freely projecting manner and protruding into the relevant blank cavity through the inflow mouth and wherein an annular inflow cross section, which is positioned coaxially in relation to the core, is formed between the core and the inflow mouth.

2. The injection-molding tool as claimed in claim 1, wherein the supporting area is at least 5 times the inflow cross section.

3. The injection-molding tool as claimed in claim 1, wherein the skin cavity has a two-dimensional cavity portion, into which the runner opens out, and from which feed impressions belonging to each inflow mouth are formed in the central plate, reach over the entire cross section of the central plate and narrow in the direction of the respective inflow mouth.

4. The injection-molding tool as claimed in claim 1, wherein the blank plate arrangement comprises at least one end mold plate and one shaft mold plate, the latter—in the closed state of the injection-molding tool—lying on the one hand against the central plate in the second separating area and on the other hand against the end mold plate.

5. The injection-molding tool as claimed in claim 4, wherein the end mold plate is configured to be arranged on the movable part of the injection-molding machine, and the shaft mold plate is mounted displaceably to a limited extent by a predetermined amount of travel on the end mold plate and is prestressed in the direction of the central plate.

6. The injection-molding tool as claimed in claim 5, wherein the end mold plate lies against the shaft mold plate and, during the opening of the injection-molding tool, a gap that is otherwise at least approximately closed forms between the end mold plate and the shaft mold plate.

7. The injection-molding tool as claimed in claim 6, wherein a compressed-gas channel, which is configured to be connected to a compressed-air source, preferably passes through the end mold plate into the gap.

8. The injection-molding tool as claimed in claim 1, wherein an end region of the blank cavities that is situated away from the supporting area is formed on the end mold plate and a shaft region of the blank cavities that is adjacent said end region is formed in the shaft mold plate.

9. The injection-molding tool as claimed in claim 1, wherein the central plate is connected to a drive which is configured to separate the central plate together with the blanks from the skin, and the travel of the central plate is chosen such that separation of the blanks from the core is ensured.

10. The injection-molding tool as claimed in claim 1, wherein a negative-pressure channel is present, opening out into the skin cavity and configured to be connected to a negative-pressure source.

11. The injection-molding tool as claimed in claim 10, wherein the negative-pressure channel contains a self-opening closing valve, which is arranged at the mouth of said channel into the skin cavity, is arranged opposite the runner and, when molding material penetrates through the runner, is brought into the closed position by said material.

12. The injection-molding tool as claimed in claim 1, wherein the skin cavity in the baseplate arrangement has concave or convex formations with advantageously predominantly axially parallel surface regions, and consequently offers a defined resistance to any discharge of the skin.

13. The injection-molding tool as claimed in claim 12, wherein the defined resistance in the direction of the opening and closing movement of the injection-molding tool is at least equal to the sum of the adhesive forces of the partial region of the skin cavity in the central plate plus the necessary forces for tearing off the blanks.

14. The injection-molding tool as claimed in claim 12, wherein the formations are formed by concentric annular slits, the inside diameters of which are determined by the cores and the outside diameters of which are determined by oversized skin bores extending right through and running coaxially in relation to the cores.

15. A process for injection molding a number of blanks in a number of blank cavities, having the following steps:
providing an injection-molding tool with a baseplate arrangement, which has a runner configured for connection to an injection-molding machine, a central plate, which—in the closed state of the injection-molding tool—lies against the baseplate arrangement in a first separating area and together with said baseplate arrangement forms a skin cavity connected to the runner, and a blank plate arrangement, which—in the closed state of the injection-molding tool—lies against the central plate in a second separating area, with said central plate delimits a number of blank cavities and is configured to be arranged on the movable part of the injection-molding machine, the blank cavities being connected to the skin cavity by way of a respective inflow mouth formed on the central plate for filling with molding material, and being delimited by a respective supporting area, which is formed on the central plate and runs in a continuous annular manner around the inflow mouth, and the supporting areas supporting the created blanks in such a way that, during the opening of the injection-molding tool, in the first separating area the blanks become separated from the skin created in the skin cavity,
wherein, for each blank cavity a pin-shaped core having a circular cross-section is fixed in the baseplate arrangement in a freely projecting manner and protruding into the relevant blank cavity through the inflow mouth and
wherein an annular inflow cross section, which is positioned coaxially in relation to the core, is formed between the core and the inflow mouth;
injecting molding material through the runner into the skin cavity and into all the blank cavities to form a contiguous molding with a sprue, a skin created in the skin cavity and the blanks created in the blank cavities;
leaving the injection-molding tool for a certain time while monitoring the temperature until a dimensionally stable state of the molding obtained in this way is achieved;
opening the injection-molding tool in the first separating area by a predetermined amount of travel, separation of the blanks from the skin taking place in the plane of the supporting area at the beginning of this travel.

16. The process as claimed in claim 15 with an injection-molding tool, wherein, during the opening of the injection-molding tool, the central plate is lifted off by a predetermined amount of travel, the amount of travel being chosen such that pushing-off of the blanks from the cores is ensured.

17. The process as claimed in claim 16, wherein the opening of the injection-molding tool takes place in two stages, in the first stage the blank plate arrangement being lifted off in the second separating area, whereby opening of the blank cavities is brought about, and in the second stage the central plate being lifted off in the first separating area, the blanks being separated from the skin.

* * * * *